United States Patent
Suzuki et al.

(10) Patent No.: US 7,187,644 B2
(45) Date of Patent: Mar. 6, 2007

(54) OPTICAL RECORDING SUBSTRATE, OPTICAL RECORDING MEDIUM, AND MANUFACTURING METHOD THEREOF

(75) Inventors: Kazutomi Suzuki, Shiki-gun (JP); Takashi Tomie, Yachiyo (JP); Kiyoto Takizawa, Hanishina-gun (JP); Suinobu Kubota, Hanishina-gun (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 498 days.

(21) Appl. No.: 10/490,940

(22) PCT Filed: Sep. 19, 2002

(86) PCT No.: PCT/JP02/09621

§ 371 (c)(1),
(2), (4) Date: Mar. 26, 2004

(87) PCT Pub. No.: WO03/030160

PCT Pub. Date: Apr. 10, 2003

(65) Prior Publication Data
US 2004/0257969 A1    Dec. 23, 2004

(30) Foreign Application Priority Data
Sep. 27, 2001  (JP) .............................. 2001-297777

(51) Int. Cl.
*G11B 3/70* (2006.01)
*G11B 7/24* (2006.01)
*B32B 3/02* (2006.01)

(52) U.S. Cl. ................... 369/288; 369/275.4; 369/283; 428/64.4

(58) Field of Classification Search ................ 369/288, 369/283, 286, 275.4, 291.1; 428/64.3, 64.4, 428/64.1, 64.2; 430/270.11
See application file for complete search history.

(56) References Cited

U.S. PATENT DOCUMENTS 6,447,868 B1* 9/2002 Sekiguchi et al. .......... 428/64.1
6,707,787 B2* 3/2004 Yamasaki et al. ........... 369/283

FOREIGN PATENT DOCUMENTS

| JP | 55-97929 A | 7/1980 |
|---|---|---|
| JP | 55-124626 A | 9/1980 |
| JP | 1-113224 A | 5/1989 |
| JP | 2-106322 A | 4/1990 |
| JP | 4-270633 A | 9/1992 |
| JP | 5-296845 A | 10/1993 |
| JP | 11-185291 A | 9/1999 |
| JP | 11-345436 A | 12/1999 |
| JP | 2001-167482 A | 6/2001 |
| JP | 2001-243658 A | 9/2001 |
| JP | 2001-243659 A | 9/2001 |
| JP | 2002-42387 A | 2/2002 |

* cited by examiner

*Primary Examiner*—Ali Neyzari
(74) *Attorney, Agent, or Firm*—Sughrue Mion, PLLC

(57) ABSTRACT

A method of manufacturing an optical recording substrate, comprising the steps of:
  contacting the surface having pit or land/grooves of a stamper having the pit or land/grooves to an organic polymer sheet having a glass transition temperature of 120 to 190° C., a single-pass birefringence retardation of +10 nm to −10 nm and a thickness of 0.35 mm or less under reduced pressure; and
  thermally pressing them. According to this method, an optical recording substrate which can transfer a stamper pattern to a thin organic polymer sheet easily and thoroughly can be manufactured.

11 Claims, 1 Drawing Sheet

OPTICAL RECORDING SUBSTRATE, OPTICAL RECORDING MEDIUM, AND MANUFACTURING METHOD THEREOF

TECHNICAL FIELD

The present invention relates to an optical recording substrate, an optical recording medium comprising the substrate and a method of manufacturing the substrate. More specifically, it relates to an optical recording substrate which can be used with an optical head having a high numerical aperture and light having a short wavelength, an optical recording medium which comprises the substrate and is capable of high-density recording, and a method of manufacturing the optical recording substrate.

BACKGROUND ART

Polycarbonate resins and polymethyl methacrylate resins have been widely used as substrate materials for optical recording such as optical disks and optical cards because they are excellent as optical materials. Out of them, polycarbonate resins are widely used as substrate materials for optical disks as they have excellent transparency, heat resistant stability and toughness.

In recent years, the recording density has been increasing due to technical progress typified by an increase in the capacity of an optical (opto-magnetic) recording disk, the development of DVD and the development of a blue laser. The thickness of a disk substrate is reduced from 1.2 mm for CDs to 0.6 mm for DVDs, and a thinner disk substrate is required to increase the recording density of an optical disk. However, in the production of an optical disk substrate having a thickness of 0.35 mm or less by injection molding, it has been difficult to obtain a substrate which is satisfactory in terms of the filling of a resin into the periphery of a substrate, thickness uniformity on inner and outer sides, and transferability of pits and grooves because the resin is cooled very quickly. Although it is possible to obtain a 0.3 mm-thick substrate which is satisfactory in terms of these characteristic properties by changing a mold and molding conditions, the value of birefringence becomes extremely large as molecular orientation by a flow of the resin at the time of molding is hardly eased. The optimization of the production conditions has its limit in the reduction of birefringence. To reduce the birefringence, amorphous polyolefins have been proposed by Zeonex, Zeonor (Japan Zeon Co., Ltd.) and Arton (JSR Corporation). Since these polyolefins have a small photoelastic coefficient, a 1.2 mm-thick polyolefin substrate having lower birefringence than a polycarbonate substrate can be obtained. However, a 0.6 mm-thick polyolefin substrate has a birefringence about ½ that of a polycarbonate substrate and a 0.3 mm-thick polyolefin substrate has almost the same high birefringence as a polycarbonate substrate. When the thickness is 0.1 mm, it is difficult to obtain a substrate having a predetermined outer diameter by injection molding and the stiffness of the substrate is reduced, whereby it is difficult to remove the substrate from a stamper and take it out by a robot.

In contrast to this, a method of transferring a stamper pattern to a film by heat and pressure by contacting the film to the stamper has been proposed. JP-A 1-113224 (the term "JP-A" as used herein means an "unexamined published Japanese patent application") proposes a method of pressure molding a thermoplastic resin film or sheet while a DC field is applied to the film or sheet at a temperature higher than the glass transition temperature of the thermoplastic resin material and discloses that birefringence nonuniformity is reduced by the above method. JP-A 4-270633 proposes a method of heating with a film-like heater sandwiched between a heating plate and a stamper and a method of letting pass a combination of the stamper and a thermoplastic resin between heating and pressure rollers to improve nonuniformity in birefringence. According to these methods, temperature elevation and cooling times are shortened to improve productivity but a stamper pattern is not partly transferred. Even if this defect cannot be observed with the naked eye, a fine defect as large as several nanometers to several micrometers can be observed through a microscope or AFM (atomic force microscope) and becomes a defect of a medium. A continuous transfer method which uses rollers and is different from these methods using a leaf type press is also proposed. JP-A 5-269845 proposes a method of transferring a pattern by sandwiching a molten resin sheet between a roll stamper having a preformat pattern on the surface and a mirror surface roller. As the resin sheet is continuously supplied in this method, the productivity is high and the number of partial transfer defects as described above is relatively small. However, force applied to the resin sheet in the longitudinal direction differs from that in the transverse direction and it is extremely difficult to maintain dimensional uniformity. JP-A 11-345436 proposes a method of correcting the position and shape of a resin sheet relative to a stamper in anticipation of its deformation. However, the size and shape of the sheet are slightly changed by winding conditions and pressing conditions and it is difficult to control these completely.

The optical recording density is expected to become higher and higher from now on and the appearance of an optical recording substrate which can be used with a laser light source having a short wavelength and an optical head having a high numerical aperture is desired. Particularly, it is urgently desired to increase the recording density of an optical disk having a high access speed and capable of high-density recording by using laser light having a short wavelength. A 0.35 mm or less thick substrate having transferred grooves and pits is the most promising to realize that. In the prior art, a substrate having the above thickness and satisfying the above requirements cannot be obtained by injection molding or press molding.

DISCLOSURE OF THE INVENTION

It is an object of the present invention to provide a method of manufacturing an optical recording substrate which solves the above problems, particularly an optical disk substrate.

It is another object of the present invention to provide a method of manufacturing an optical recording substrate, which can transfer a stamper pattern to a thin organic polymer sheet easily and thoroughly by a thermal pressing method.

It is still another object of the present invention to provide a method of manufacturing an optical recording medium capable of high density recording using an optical recording substrate manufactured by the above method.

It is a further object of the present invention to provide an optical recording substrate and an optical recording medium obtained by the methods of the present invention.

Other objects and advantages of the present invention will become apparent from the following description.

According to the present invention, firstly, the above objects and advantages of the present invention are attained by a method of manufacturing an optical recording substrate, comprising contacting the surface having pit or land/grooves of a stamper having the pit or land/grooves to an organic polymer sheet having a glass transition temperature of 120 to 190° C., a single-pass birefringence retardation of +10 nm to −10 nm and a thickness of 0.35 mm or less under reduced pressure and thermally pressing them.

According to the present invention, secondly, the above objects and advantages of the present invention are attained by a method of manufacturing an optical recording medium, comprising forming a reflection film and/or a recording film on the surface to which the pit or land/grooves of a stamper have been transferred of an optical recording substrate obtained by the above method of the present invention.

According to the present invention, thirdly, the above objects and advantages of the present invention are attained by an optical recording substrate and an optical recording medium obtained by the above methods of the present invention.

BEST MODE FOR CARRYING OUT THE INVENTION

Figure 1:
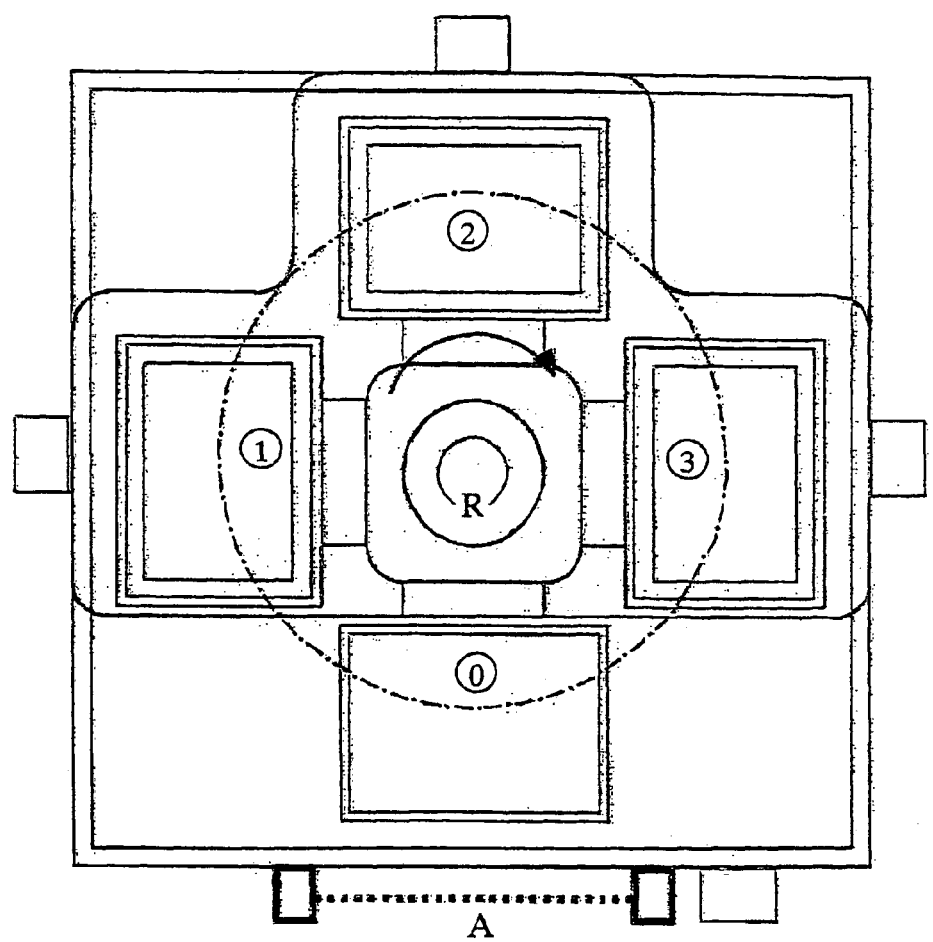
FIG. 1 is a diagram for explaining the production process of an optical recording substrate used to carry out the method of the present invention.

A description is first given of the organic polymer sheet.

The thickness of the organic polymer sheet in the present invention is 0.35 mm or less, preferably 0.35 to 0.001 mm. The thickness of a substrate existent in the optical path up to a reflection surface is preferably as thin as possible because the aberration of light when the recording surface (reflection surface) of an optical recording medium is inclined by warp becomes large depending on the distance between the object lens of an optical pick-up and the recording surface (reflection surface) of the optical recording medium. Although the thickness of a DVD which is put on the market is 0.6 mm, a substrate (light transmission layer) having a thickness of 0.3 mm or 0.1 mm is needed. The present invention can be used to manufacture the thin substrate.

The material of the optical recording substrate of the present invention must have a glass transition temperature of 120 to 190° C. Since an optical disk is often used in a car at a high temperature, a heat resistance test at 110° C. is required for the optical disk. When the glass transition temperature of the optical disk is low, not only the thermal deformation of appearance but also the deformation of a format pattern of pits or lands/grooves caused by the heat of a laser at the time of recording or reproduction or/and the application of a high-power laser beam to a phase change optical recording medium at the time of initialization (initial crystallization) may occur. From this point of view, the glass transition temperature is preferably as high as possible, for example, 120° C. or higher, more preferably 130° C. or higher. When the glass transition temperature is too high, it is difficult to transfer the pit or land/grooves of the stamper to the sheet at the time of molding, resulting in a transfer failure or large birefringence.

One of the big features of the present invention is that the single-pass birefringence retardation of the organic polymer sheet used as a material before molding is +10 nm to −10 nm. The term "birefringence retardation" means retardation when light having a wavelength of 633 nm is incident vertically on the surface of the sheet (vertical incidence). When the retardation is in the range of +10 nm to −10 nm, satisfactory electric properties are obtained. Retardation differs according to the wavelength of laser light used for the recording and reading of an optical recording medium. The retardation value with laser light having a wavelength of 400 nm differs only about 2% from the retardation value with laser light having a wavelength of 633 nm. If an optical recording medium for recording and reading with laser light having a wavelength of 420 nm satisfies this range, satisfactory electric properties are obtained. Examples of a sheet material which satisfies the above condition include polycarbonate resins and amorphous polyolefin resins such as Zeonex and Zeonor (of Nippon Zeon Co., Ltd.) and Arton (of JSR Corporation). A copolymer of polystyrene having opposite birefringence to that of a polycarbonate and polycarbonate may also be used. The annealing of a sheet manufactured by an extrusion method is effective because its absolute value of birefringence is large or its birefringence in a lengthwise direction differs from its birefringence in a transverse direction. The PURE-ACE (trade name, manufactured by Teijin Limited) which is a cast polycarbonate film is particularly excellent because it has a small birefringence and almost no film thickness distribution.

At least one side in contact with the stamper of the organic polymer sheet used in the present invention is preferably roughened. As described above, in the conventional leaf type press method, not only an untransferred portion as large as 1 mm to several centimeters which can be observed with the naked eye but also a very small untransferred portion which can be detected by a microscope or AFM are existent and it has been difficult to completely solve this problem by changing only pressing conditions. The inventor of the present invention has conducted intensive studies on this problem and has found that air remaining between the stamper and the organic polymer sheet is the main cause of this. When the organic polymer sheet is placed upon the stamper, the both are partially closely adhered to each other and air remaining between them may not be completely removed. Particularly when the pressing temperature is set higher than the glass transition temperature of the organic polymer sheet, partial fusion between the contact portions of them occurs and air is not removed from an area surrounding these contact portions even by carrying out evacuation for a long time after that. To solve this problem, air existent between the organic polymer sheet and the surface having pit or land/grooves of the stamper (may be referred to as "information surface" hereinafter) must be completely removed before the both are contacted to each other completely, or the pressing temperature must be set to room temperature or lower than at least the glass transition temperature to assemble them together, and evacuation must be fully carried out before the pressing temperature is raised. However, in the former case, the apparatus becomes complex and in the latter case, the production speed becomes low. To improve this, it is effective that the surface of the organic polymer sheet in contact with the information surface of the stamper be roughened or embossed and the pressure be reduced before pressing so that the remaining air is easily escaped. If air remains on the surface opposite to that surface, the substantial contact pressure to be applied to the stamper may change and affect transferability. Therefore, the opposite surface is preferably roughened or embossed as well. The roughened surface may have any form but when it contacts the stamper, an air layer is preferably continuous. In this sense, projections on the surface of the sheet are more preferred than depressions. For example, the sectional form of each projection may be square, rectangular, circular, triangular or trapezoidal with a flat top. The height of each projection is suitably selected but when it is too small, the effect of improving the escape of air is small. When it is too large, part of the projection form remains after thermal pressing disadvantageously. It is preferred that before pressing, the projections should not contact the stamper completely and after pressing, the projections should disappear completely. From this point of view, the height of each projection is preferably 1 to 100 µm, more preferably 1 to 20 µm. The method of roughening the surface is not particularly limited. For example, a substrate having an uneven surface such as a woven or knitted stuff is contacted to the sheet to transfer its surface uneven form to the sheet by thermal pressing. To make simple the top form of each projection on the sheet, it is preferred not to have the resin of the sheet enter between the fibers of the woven or knitted stuff. To this end, the woven or knitted stuff is slightly impregnated with a suitable resin to fill it between the fibers but retains an uneven surface. Since filling is preferably carried out by thermal pressing, the resin to be filled preferably has heat resistance. A fluororesin such as Teflon (registered trademark) is preferably used because it has excellent releasability from a sheet. For example, a glass fiber sheet impregnated with Teflon (registered trademark) is preferably used.

As the organic polymer sheet needs to transmit laser light for recording and reading information, it preferably has a high transmittance of 85% or more, for example.

The optical recording medium has guide grooves for a light beam for recording and reading information and pits for recording position information, information on the revolution of a disk with a drive and recording and reading conditions for signals. In the method of the present invention, the optical recording substrate is manufactured by transferring these forms to the organic polymer sheet by thermally pressing the information surface of the stamper under reduced pressure. The reduced pressure is preferably about 0.3 atm. ($3 \times 10^4$ Pa) or less to remove air from the system in order to assist transfer. It is more preferably about 0.1 atm. because the apparatus is airtight. The term "thermal pressing" means the application of pressure under heating. The temperature used for thermal pressing is preferably 5 to 50° C., more preferably 15 to 35° C. higher than the glass transition temperature of the organic polymer sheet. When the temperature is lower than the above range, satisfactory transfer is hardly effected and when the temperature is higher than the above range, a problem such as the deformation of the organic polymer sheet readily occurs. For example, in the case of a resin having a glass transition temperature of 145° C., the temperature is preferably 160 to 180° C. The preferred pressure to be applied which changes according to the used resin, temperature and other conditions is, for example, 6 to 16 MPa. When the pressure is lower than the above range, satisfactory transfer is hardly effected and when the pressure is higher than the above range, it may be difficult to release the organic polymer sheet when taken out after thermal press molding.

To apply pressure to the organic polymer sheet/stamper information surface uniformly at the time of thermal pressing is important in order to prevent the formation of an untransferred portion. When there is a problem with the parallelism of the press (between upper and lower press tables) and the smoothness of contact surfaces, pressure is not applied uniformly. Thermal pressing by sandwiching the organic polymer sheet and the stamper between metal plates is preferred and often carried out. The smoothness of the metal plates is not always satisfactory. In this case, pressure is hardly transmitted uniformly and a transfer failure area may be formed. To minimize this influence during the thermal pressing operation, a cushion material is preferably used. From the viewpoints of elasticity and heat resistance, silicone rubber or fluororesin-based rubber is preferably used as the material of the cushion material. When the thickness of the cushion material is too large, heat conductivity becomes small and when the thickness is too small, the effect of applying pressure uniformly decreases. Therefore, a cushion material having a thickness of about 0.5 to 2 mm is preferably used. It is effective to use this cushion material between the press table and the stamper or between the press table and the organic polymer sheet, preferably both.

The size of the optical recording substrate manufactured by the method of the present invention is not particularly limited. When the optical recording substrate is an optical disk substrate, it is generally 30 mm to 300 mm in diameter and preferably doughnut-shaped with a center hole having a diameter of about 15 mm.

The optical recording substrate of the present invention can be manufactured by modifying conventionally known thermal press molding equipment. To obtain the reduced pressure, for example, an area surrounded by a heat resistant material having elasticity such as silicone rubber may be evacuated by a vacuum pump. A problem of the conventional leaf type thermal press that cooling and heating take time can be solved by using a working stage which enables four steps consisting of the step of taking out each substrate and setting an organic polymer sheet, the step of preheating, the step of thermal pressing and the step of gradually cooling to be automatically and continuously carried out in one cycle as shown in FIG. 1 in Example, thereby improving productivity.

The optical recording substrate to be manufactured by the method of the present invention is a substrate used for optical cards and optical disks, particularly rewritable disks such as optical magnetic recording media, phase change recording media, media using a dye which can write once (to be called "-R") and media in which signals are originally recorded in the form of pits (called "-ROM").

A recording layer and/or a reflection layer and optionally a protective layer or protective resin layer are formed on these optical recording substrates according to purpose. If necessary, two of the above laminates are laminated and used as an optical recording medium, for example, optical disk. The recording layer and/or reflection layer are/is formed on the surface on which the pit or land/grooves of the stamper have been transferred of the optical recording substrate. In an optical disk which reads information by using a laser having a wavelength of 420 nm or less called "blue recording media" or records and reads information, a thin substrate is in keen demand and the influence of birefringence is more important. Therefore, the effect of the present invention is large.

The optical recording substrate in the present invention is a thin substrate for high-density optical recording which has pits and grooves and is advantageous in shortening a writing and reading wavelength required for future high-density recording and increasing the numerical aperture of an optical head. Particularly, it is an optical disk substrate used for high-density recording.

EXAMPLES

The following examples are given to further illustrate the present invention. The present invention is not limited to these examples.

Example 1

An optical recording substrate was molded with the NIC200 molding machine of Nissei Jushi Kogyo Co., Ltd. This molding machine comprises four stages as shown in FIG. 1: (1) setting a sample (sheet) and taking out a substrate (press 0), (2) preheating press (press 1), (3) heating press (press 2) and (4) cooling press (press 3). A laminate consisting of a stamper and an organic polymer sheet was fixed on a rotary board R to be turned and moved every predetermined time while its interface was kept in reduced pressure. In the press 0, materials to be pressed such as the stamper and the organic polymer sheet were laminated. After laminated, the press 0 was covered, evacuation was started and the resulting laminate was turned and moved to the next stage. The materials to be pressed were preheated by the press 1 and heated to a predetermined temperature by the press 2 to transfer the surface form of the stamper. Thereafter, the laminate was cooled and fixed by the press 3 and the obtained substrate was taken out from the opening A of the press 0.

As the organic polymer sheet was used a 100 μm-thick PURE ACE film (trade name; to be referred to as "PC film", manufactured by Teijin Limited) which is a polycarbonate film manufactured by casting. This film had a glass transition temperature measured by DSC (differential scanning calorimetry) of 160° C. and a single-pass birefringence retardation of 7 nm. The stamper for blue laser recording had an outer diameter of 138 mm (outer diameter of a recording zone: 118 mm) at a groove depth of 45 nm and a track pitch of 0.3 μm (land/groove recording). The PC film was contacted to the information surface of the stamper and the resulting laminate was sandwiched between 1.0 mm-thick stainless steel plates (the contact surface of the PC film was a mirror surface) and set at the press 0 position of a sheet molding machine. After setting, evacuation was started, and the laminate was moved to the preheating step after 10 minutes. Pressing was carried out at a preheating temperature of 150° C., a heating temperature of 170° C. and a pressure of 20 tons for a time of 1 minute. The cooling step was carried out at a temperature of 20° C. for a time of 1 minute.

The obtained optical disk substrate was observed (1) with the naked eye, (2) by illuminating with a halogen lamp as a powerful light source, and (3) through an AFM (the SFA-300 atomic force microscope of Seiko Instruments Inc.) to check the transfer of grooves and the existence of a fine defect. Five sheets manufactured under the same conditions were observed. They were satisfactory substrates which had no problem with transferability when judged from the shapes of lands and grooves and the depth of grooves obtained by observation through AFM and no surface abnormalities (partial clouding due to transfer abnormality) when observed with the naked eye.

It was confirmed when observed through a halogen lamp that the substrate had no problem.

The birefringence retardation of the organic polymer sheet after transfer was 6 nm which was slightly lower than that before the molding of the sheet.

Comparative Example 1

A sheet was molded in the same manner as in Example 1 without evacuation. In this case, a transfer failure was observed in about 40% of the total area with the naked eye. It can be understood when compared with Example 1 that evacuation is necessary to effect satisfactory transfer.

Example 2

The procedure of Example 1 was repeated except that one side of a PC film was roughened by contacting it to a glass fiber fabric impregnated with Teflon (registered trademark) using the above sheet molding machine and the evacuation time in the press 0 was changed to 1 minute. This roughened surface was contacted to the information surface of the stamper, and molding and evaluation were carried out in the same manner as in Example 1. In this case, although the evacuation time in the press 0 was made shorter than in Example 1, good evaluation results were obtained for all the five samples. It was thereby confirmed that a high yield could be obtained by roughening the surface of the PC film after the molding cycle was shortened to raise productivity.

When the thickness distribution of the film was measured at intervals of 1 cm in both longitudinal and transverse directions, the average value was 100.2 μm and the standard deviation was 1.0 μm before molding. When it was measured at the same positions after molding, the average value was 100.5 μm and the standard deviation was 1.2 μm. It was thereby understood that the roughening of the surface did not have any influence upon the thickness distribution after molding and a small thickness distribution was maintained.

Example 3

A sheet was molded in the same manner as in Example 1 except that a partially deformed stainless steel plate was used as the stainless steel plate and a 1.2 mm-thick silicone rubber sheet was inserted between the press table and the deformed stainless steel plate (constitution: silicone rubber/stainless steel plate/PC film having one roughened side/stamper/stainless steel plate). Five optical disk substrates were molded and evaluated in the same manner as in Example 1. Good results were obtained in all the evaluations (1) to (3) of all the substrates. It was considered that the silicone rubber functioned as a cushion material even though the stainless steel plate was slightly deformed so that force was applied uniformly to all the contact surfaces of the PC film and the stamper.

Example 4

A 300 μm-thick polycarbonate sheet molded by a melt extrusion method was used in place of the PC film used in Example 1. As the birefringence retardation of this sheet was 31 nm, it was annealed at 165° C. for 20 minutes before use. This treatment reduced the birefringence retardation of the sheet to 1.2 nm. The sheet molding conditions were the same as in Example 1. In this case, five substrates were evaluated in the same manner as in Example 1. Good results were obtained in all the evaluations (1) to (3). The birefringence retardation after the molding of the sheet almost remained unchanged at 1.1 nm.

Comparative Example 2

A sheet was molded in the same manner as in Example 4 except that annealing was not carried out. The birefringence retardation after molding of the sheet was 23 nm.

Evaluation of Electric Properties

The substrates obtained in Examples 1, 3 and 4 and Comparative Example 2 were punched into a doughnut shape having an inner diameter of 15 mm and an outer diameter of 120 mm, a phase change recording film which was a laminate consisting of inorganic thin films was formed on the groove surfaces of the substrates by sputtering, and a polycarbonate disk having a thickness of 1.2 mm, an inner diameter of 15 mm and an outer diameter of 120 mm was laminated on the laminate of inorganic thin films to manufacture optical disks. The constitutions of the disks are shown in Table 1.

TABLE 1 film constitutions of phase change optical recording media

| | |
|---|---|
| Optical disk substrate of the present invention | 0.1 mm or 0.3 mm |
| ZnS SiO$_2$ dielectric film | 50 nm |
| SiO$_2$ dielectric film | 50 nm |
| ZnS SiO$_2$ dielectric film | 25 nm |
| GeSbTe phase change recording film | 17 nm |
| ZnS SiO$_2$ dielectric film | 17 nm |
| AlCr metal reflection film | 100 nm |
| Ultraviolet light curable resin adhesion layer | About 2 μm |
| Polycarbonate board | 1.2 mm |

The method of manufacturing the laminate of inorganic thin films by sputtering is as follows.

A ZnS—SiO$_2$ film (film obtained by sputtering a target of ZnS:SiO$_2$=80:20 mol %) and an SiO$_2$ film were used as dielectric films. The recording layer was a GeSbTe alloy film (Ge:Sb:Te=2:2:5 atom %). The reflection layer was an AlCr alloy film (Al:Cr=97:3 atom %). These inorganic thin films were formed on a transparent substrate by magnetron sputtering. The used sputtering device was the in-line sputtering device of ANELVA Corp. (ILC3102), and the target was an 8-inch diameter substrate which turned on its own axis and revolved while a film was formed thereon. The thickness of each film was adjusted by the sputtering time. The thickness of the dielectric film was adjusted to ensure that reflectance became about 25% when it was illuminated to the surface with light having a wavelength of 410 nm. The refractive index of the ZnS—SiO$_2$ film (wavelength of 633 nm) was 2.18, the refractive index of the SiO$_2$ film (wavelength of 633 nm) was 1.53, and the reflectance of the recording film after crystallization (initialization) (wavelength of 410 nm) was 7.2%.

The recording and reading properties of these optical disks were evaluated as follows. The evaluation machine used was the DDU-1000 of Palsteck Kogyo Co., Ltd. Owing to differences in the thickness of the substrate (sheet), an optical head having a laser wavelength of 400 nm and an NA of 0.85 was used in Examples 1 and 3 (thickness of 100 μm) and an optical head having a laser wavelength of 402 nm and an NA of 0.65 was used in Example 4 (thickness of 300 μm). To check absolute performance and the transfer uniformity of the stamper form, the size of a read signal and disk one-cycle variations in the read signal (envelope variations of read signal) were evaluated.

Evaluation Conditions

Lands and grooves were measured at measurement radii of 28 nm (inner end) and 58 mm (outer end)

Linear speed of recording and reading=4.0 m/sec

Linear recording density=0.115 μm/bit (1–7RLL modulation recording)

Recording laser power=3.2 mW (Examples 1 and 3), 4.5 mW (Example 4)

Erasing laser power=1.5 mW (Examples 1 and 3), 3.2 mW (Example 4)

Reading laser power=0.4 mW (Examples 1 and 3), 0.5 mW (Example 4)

Evaluation Results

Table 1 shows CNR (dB) of a 1–7 modulated 3T read signal and one-cycle variations (%) in the amplitude of the read signal. Optical disk media of Examples have a CNR of 46 dB which is said to be required for digital recording. The change rate of the read signal envelope was satisfactory at 5% or less. The optical disk medium of Comparative Example 2 had a low CNR. Particularly, the CNR difference between the land track and the groove track was large which seemed to be influenced by the large birefringence. The change of output envelope was large.

TABLE 2

Evaluation results of recording and reading properties

| | | CNR (dB) | | Envelope variation (%) | |
|---|---|---|---|---|---|
| | | Inner end | Outer end | Inner end | Outer end |
| Example 1 | Land | 49.8 | 49.0 | 4.1 | 4.8 |
| | Groove | 50.1 | 49.4 | 3.8 | 4.1 |
| Example 3 | Land | 51.2 | 50.2 | 2.5 | 3.1 |
| | Groove | 52.3 | 52.1 | 2.8 | 3.8 |
| Example 4 | Land | 49.8 | 48.7 | 3.0 | 4.2 |
| | Groove | 47.5 | 47.2 | 3.5 | 4.6 |
| Comparative Example 2 | Land | 46.8 | 45.9 | 5.1 | 5.3 |
| | Groove | 43.6 | 43.0 | 6.2 | 6.2 |

The invention claimed is:

1. A method of manufacturing an optical recording substrate, comprising the steps of:
   contacting the surface having pit or land/grooves of a stamper having the pit or land/grooves to an organic polymer sheet having a glass transition temperature of 120 to 190° C., a single-pass birefringence retardation of +10 nm to −10 nm and a thickness of 0.35 mm or less under reduced pressure; and
   thermally pressing them.

2. The method of claim 1, wherein at least the surface in contact with the stamper of the organic polymer sheet is roughened.

3. The method of claim 1 or 2, wherein the organic polymer sheet and the stamper are thermally pressed on a press table by inserting a cushion material between the organic polymer sheet and the press table and/or between the stamper and the press table.

4. A method of manufacturing an optical recording medium, comprising forming a reflection film and/or a recording film on the surface to which the pit or land/grooves of the stamper have been transferred of an optical recording substrate obtained by the method of any one of claims 1 to 2.

5. An optical recording substrate manufactured by the method of any one of claims 1 to 2.

6. The optical recording substrate of claim 5 which is a disk.

7. An optical recording medium manufactured by the method of claim 4.

8. The optical recording medium of claim 7 which is a disk.

9. A method of manufacturing an optical recording medium, comprising forming a reflection film and/or a recording film on the surface to which the pit or land/grooves of the stamper have been transferred of an optical recording substrate obtained by the method of claim 3.

10. An optical recording substrate manufactured by the method of claim 3.

11. The optical recording substrate of claim 10 which is a disk.

* * * * *